(12) United States Patent
Wojciechowski et al.

(10) Patent No.: US 6,715,993 B2
(45) Date of Patent: Apr. 6, 2004

(54) METHODS AND APPARATUS FOR MANUFACTURING ROTOR SHAFTS

(75) Inventors: Charles Robert Wojciechowski, West Chester, OH (US); Gary Mac Holloway, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/202,757

(22) Filed: Jul. 25, 2002

(65) Prior Publication Data

US 2004/0018092 A1 Jan. 29, 2004

(51) Int. Cl.$^7$ ................................. F01D 5/06
(52) U.S. Cl. ................. 416/244 A; 415/216; 415/1; 228/107; 29/889.2; 29/428
(58) Field of Search ................. 415/216.1; 416/244 A; 228/107; 29/889.2, 428, 505

(56) References Cited

U.S. PATENT DOCUMENTS

| | | | |
|---|---|---|---|
| 3,434,197 A | * | 3/1969 | Davenport ................. 228/107 |
| 5,242,098 A | | 9/1993 | Hardwick |
| 5,261,591 A | | 11/1993 | Hardwick |
| 5,323,955 A | | 6/1994 | Bergmann et al. |
| 5,400,945 A | | 3/1995 | Bergmann et al. |
| 5,425,494 A | * | 6/1995 | Rosenthal et al. ....... 228/124.5 |
| 6,210,283 B1 | | 4/2001 | Wojciechowski et al. |
| 6,234,912 B1 | | 5/2001 | Koschier et al. |
| 6,315,487 B1 | * | 11/2001 | James ...................... 403/270 |
| 6,352,385 B1 | | 3/2002 | Wojciechowski et al. |

* cited by examiner

*Primary Examiner*—Ninh H. Nguyen
(74) *Attorney, Agent, or Firm*—William Scott Andes; Armstrong Teasdale LLP; Robert B. Reeser, III

(57) ABSTRACT

A method for manufacturing a rotor shaft includes fabricating a first shaft portion that extends axially from a first end to a second end, fabricating a second shaft portion that extends axially from a first end to a second end, and coupling the second shaft portion to the first shaft portion with an explosive bonded joint such that the second shaft portion is aligned substantially concentrically with respect to the first shaft portion, and such that the bonded joint extends obliquely with respect to a centerline axis of symmetry of the rotor shaft.

12 Claims, 3 Drawing Sheets

METHODS AND APPARATUS FOR MANUFACTURING ROTOR SHAFTS

GOVERNMENT RIGHTS STATEMENT

The U.S. Government has certain rights in this invention pursuant to contract number F333615-94-2-4439.

BACKGROUND OF THE INVENTION

This invention relates generally to gas turbine engines, and more specifically to rotor shafts used with gas turbine engines.

At least some known gas turbine engines include a core engine having, in serial flow arrangement, a fan assembly, a high pressure compressor which compress airflow entering the engine, a combustor which burns a mixture of fuel and air, and low and high pressure turbines which each include a plurality of rotor blades that extract rotational energy from airflow exiting the combustor. The fan assembly and the low pressure turbine are coupled by a first shaft, and the high pressure compressor and the high pressure turbine are coupled by a second shaft.

During engine operation, the fan assembly and the low-pressure turbine are subjected to different operating temperatures, pressures, and stresses than those that the high pressure turbine and compressor are subjected. As a result, within at least some known gas turbine engines, the rotor shaft coupling the low pressure components is fabricated from a different material than the heavier, more durable material used in fabricating the rotor shaft that couples the high pressure components. However, because the low-pressure shaft extends the length of the gas turbine engine, a portion of the low-pressure shaft is exposed to the same temperatures and pressures as the high pressure turbine components. To facilitate optimizing engine weight considerations with operating stresses that may be induced to the shaft, at least some known low-pressure shafts include an upstream portion that is fabricated form a first material and a downstream portion that is fabricated from a second material. For example, a forward portion of the low-pressure shaft connected to the fan assembly and the aft portion of the low-pressure shaft connected to the low-pressure turbine may be fabricated from a nickel alloy, while an intermediate portion of the shaft extending through the compressor and high pressure turbine may be fabricated from a titanium alloy. Because such materials are dissimilar, explosive bonding is used to create a bonded joint that is then used to couple the two nickel shaft portions to the intermediate titanium alloy section of the shaft such that the bonded joint extends therebetween.

A low strength inner layer material is used to separate the plates used in forming the bonded joint. The inner layer material facilitates preventing the production of deleterious intermetallic compounds across the bonded joint. More specifically, the low strength inner layer material extends diametrically across the bonded joint, such that when the rotor shaft portions are coupled at the bonded joint, the inner layer of material extends substantially perpendicularly to a centerline axis of symmetry of the shaft. Within known bond joints, when the shaft is rotated, the low strength material resides completely in a plane of maximum shear stress. As a result, during engine operation, the inner layer material may significantly limit the performance of the bonded joint.

BRIEF SUMMARY OF THE INVENTION

In one aspect of the invention, a method for manufacturing a rotor shaft is provided. The method comprises fabricating a first shaft portion that extends axially from a first end to a second end, fabricating a second shaft portion that extends axially from a first end to a second end, and coupling the second shaft portion to the first shaft portion with an explosive bonded joint such that the second shaft portion is aligned substantially concentrically with respect to the first shaft portion, and such that the bonded joint extends obliquely with respect to a centerline axis of symmetry of the rotor shaft.

In another aspect, a rotor shaft is provided. The rotor shaft includes a first shaft portion that extends axially from a first end to a second end, and a second portion that extends axially from a first end to a second end, wherein the first shaft portion is coupled to the second portion at a bonded joint such that the first shaft portion is substantially axially-aligned with respect to the second shaft portion. The bonded joint extends obliquely with respect to a centerline axis of symmetry of the rotor shaft.

In a further aspect of the invention, a gas turbine rotor shaft is provided. The gas turbine rotor shaft includes a first shaft portion, a second shaft portion, and a bonded joint extending therebetween. The bonded joint is substantially concentrically aligned with respect to said first and second portions, and is oblique with respect to a centerline axis of symmetry extending axially through the rotor shaft.

DETAILED DESCRIPTION OF THE INVENTION

Figure 1:
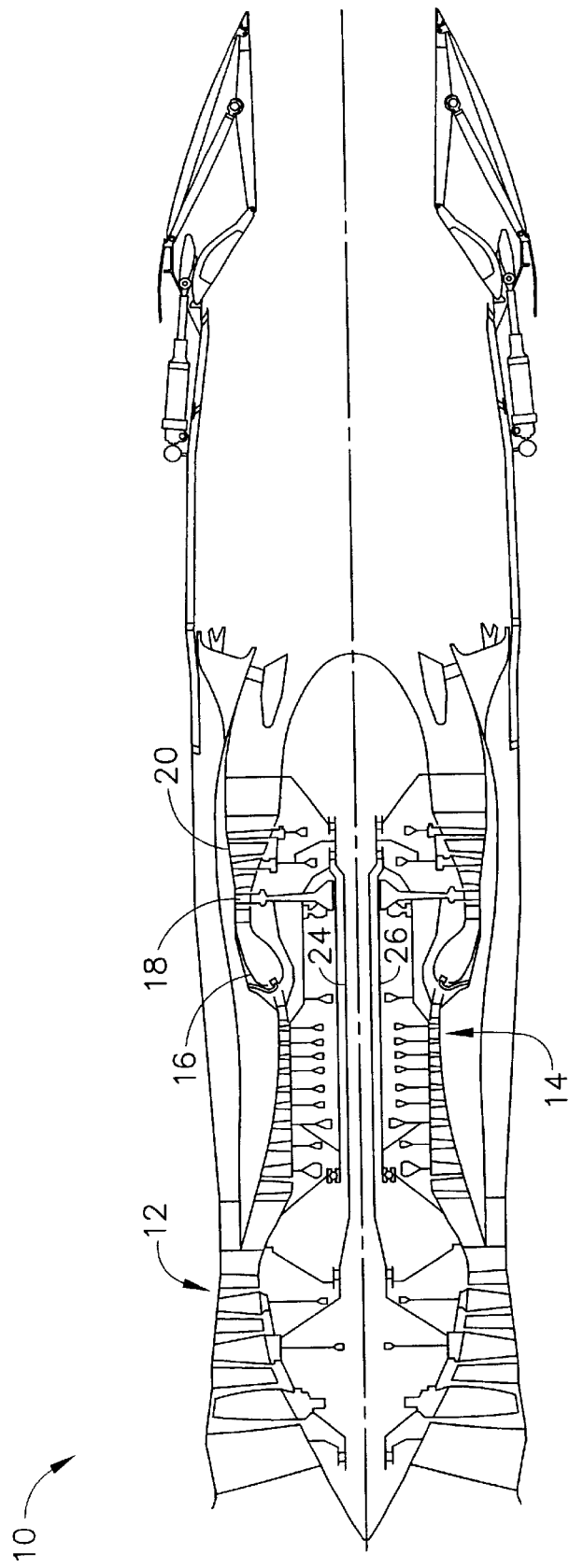
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22. A load (not shown) may also coupled to gas turbine engine 10 with first shaft 21. In one embodiment, gas turbine engine 10 is an F110 available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 3:
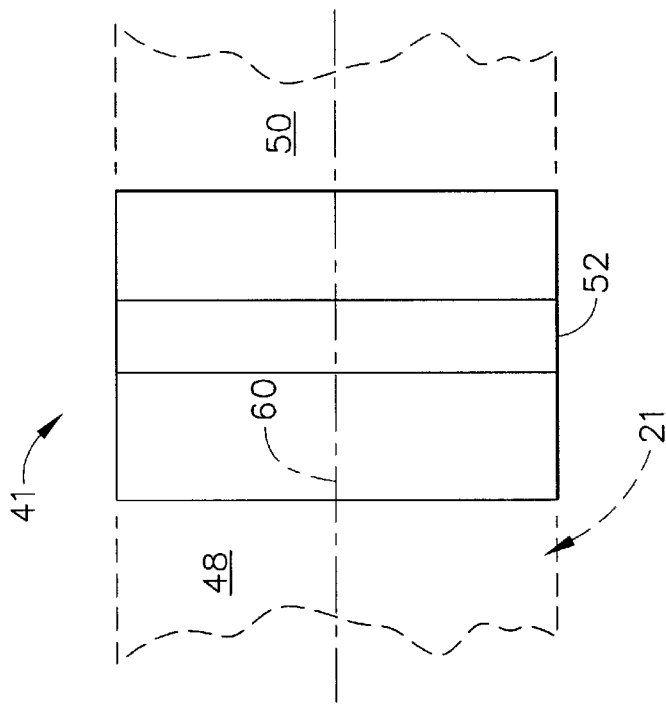
FIG. 3 is an enlarged side view of a known shaft bonded joint section created from the explosive bonded joint shown in FIG. 2.
Figure 2:
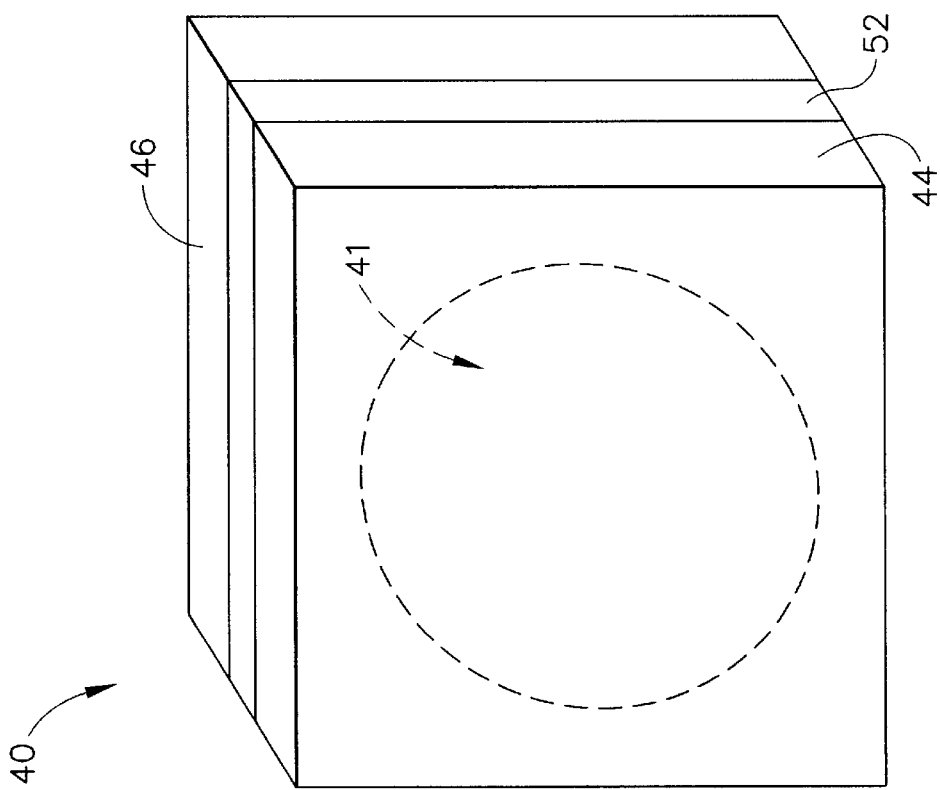
FIG. 2 is a partial perspective view of a known explosive bonded joint.

FIG. 2 is a partial perspective view of a known explosive bonded joint 40. FIG. 3 is an enlarged side view of a known shaft bonded joint section 41 created from explosive bonded joint 40. Bonded joint 40 is formed by explosive bonding which enables the joining of dissimilar or metallurgically incompatible metals, such that a rotor shaft, such as shaft 21 may be fabricated from a plurality of different materials.

Specifically, bonded joint 40 is fabricated by creating an explosive bonded sandwich of plates 44 and 46 that are each fabricated from the same respective material as used in fabricating an upstream portion 48 of shaft 21 and a downstream portion 50 of shaft 21. More specifically, plate 44 and shaft upstream portion 48 are each fabricated from a first material, and plate 46 and shaft downstream portion 50 are each fabricated from a second material. In the exemplary embodiment, the first material is a nickel alloy, and the second material is a titanium alloy.

Before plates 44 and 46 are explosively bonded together, a low strength inner layer 52 is positioned between plates 44 and 46 to separate plates 44 and 46. In addition, because layer 52 is fabricated from a material that is not the same as either material used to fabricate shaft portions 48 and 50, layer 52 facilitates preventing the production of deleterious intermetallic compounds. In the exemplary embodiment, layer 52 is fabricated from a niobium alloy.

After plates 44 and 46, and layer 52 have been explosively bonded together in a known explosive bonding process, shaft section 41 is cut from plates 44 and 46 and used to couple shaft portions 48 and 50. Specifically, when shaft portions 48 and 50 are coupled together, shaft section 41 extends therebetween, such that inner layer 52 extends diametrically across rotor shaft 21 and is substantially perpendicular to a centerline axis of symmetry 60 extending through shaft 21. However, during operation, as shaft 21 rotates, shear stress is induced into shaft 21. More specifically, because of an orientation of inner layer 52 with respect to shaft 21, inner layer 52 resides completely in a plane of maximum shear stress as shaft 21 is rotated. As a result, during engine operation, inner layer material 52 may significantly limit the performance of the bonded joint.

Figure 5:
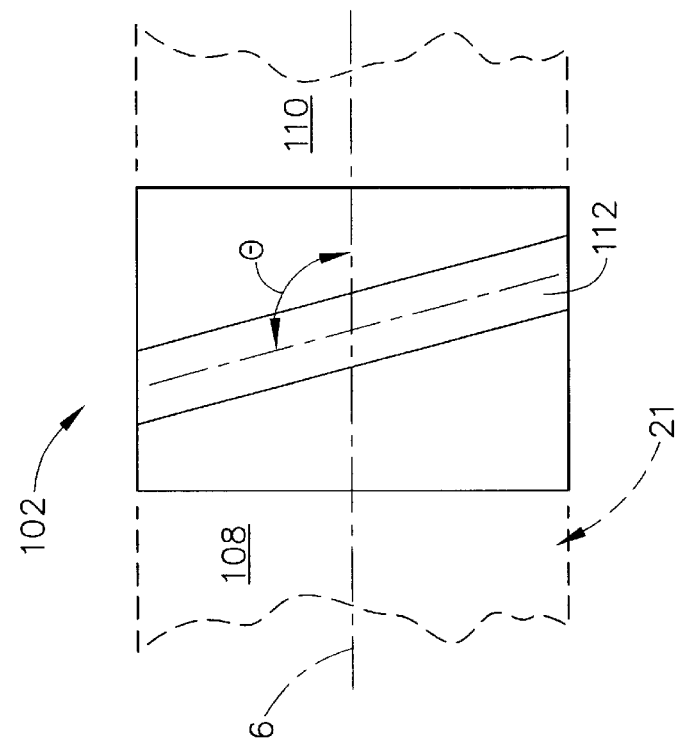
FIG. 5 is an enlarged side view of a shaft bonded joint section created from the explosive bonded joint shown in FIG. 3.
Figure 4:
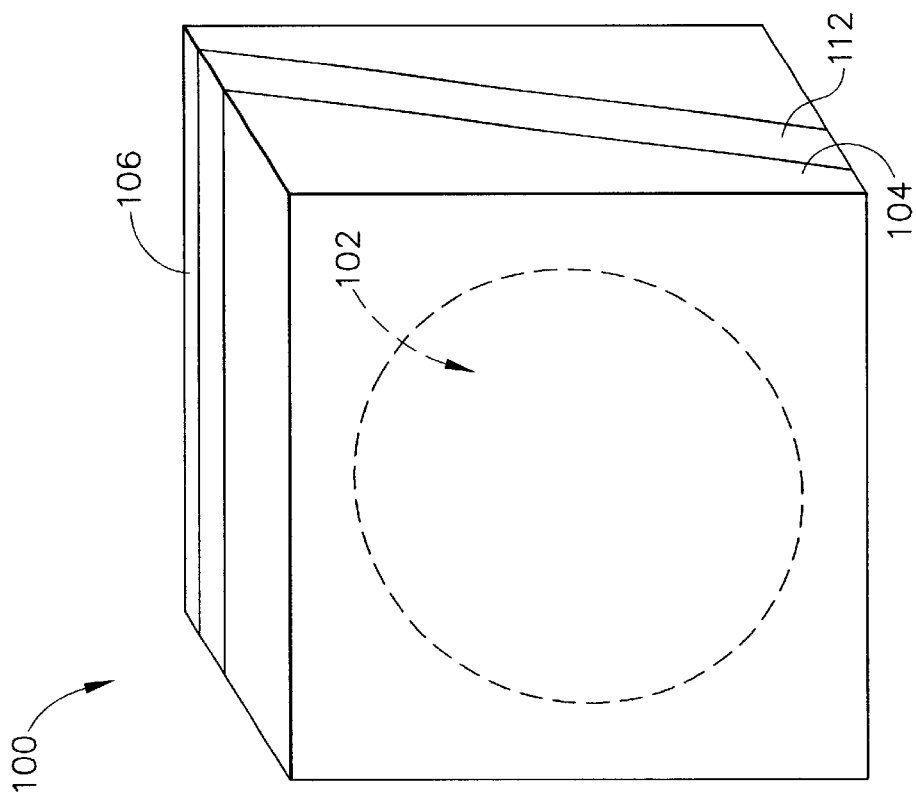
FIG. 4 is a partial perspective end view of a bonded joint that may be used with a rotor shaft shown in FIG. 1.

FIG. 4 is a partial perspective end view of a bonded joint 100 that may be used with a rotor shaft, such as shaft 21. Alternatively, bonded joint 100 may be used with shafts (not shown) not used in the aviation industry, such as, but not limited to, shafts used in automobile engines. FIG. 5 is an enlarged side view of shaft bonded joint section 102 created from explosive bonded joint 100. Bonded joint 100 is formed by explosive bonding which enables the joining of dissimilar or metallurgically incompatible metals, such that a rotor shaft, such as shaft 21 may be fabricated from a plurality of different materials.

Specifically, bonded joint 100 is fabricated by creating an explosive bonded sandwich of plates 104 and 106 that are each fabricated from the same respective material as used in fabricating an upstream portion 108 of shaft 21 and a downstream portion 110 of shaft 21. More specifically, plate 104 and shaft upstream portion 108 are each fabricated from a first material, and plate 106 and shaft downstream portion 110 are each fabricated from a second material. In the exemplary embodiment of FIGS. 4 and 5, the first material is a nickel alloy, and the second material is a titanium alloy.

Before plates 104 and 106 are explosively bonded together, a low strength inner layer 112 is positioned between plates 104 and 106 to separate plates 104 and 106. In addition, because layer 112 is fabricated from a material that is not the same as either material used in fabricating shaft portions 108 and 110, layer 112 facilitates preventing the production of deleterious intermetallic compounds. In one embodiment, layer 112 is fabricated from a niobium alloy.

After plates 104 and 106, and layer 112 have been explosively bonded together in a known explosive bonding process, shaft section 102 is cut from plates 104 and 106 and used to couple shaft portions 108 and 110. Specifically, when shaft portions 108 and 110 are coupled together, shaft section 102 extends therebetween, such that inner layer 112 extends diametrically across rotor shaft 21. However, unlike inner layer 52 (shown in FIGS. 2 and 3), inner layer 112 extends obliquely with respect to a centerline axis of symmetry 120 extending through shaft 21. More specifically, inner layer 52 is positioned at an oblique angle θ with respect to centerline axis of symmetry 120. In one embodiment, angle θ is approximately 105° degrees.

During operation, as shaft 21 rotates, torsional shear stress is induced into shaft 21. However, because inner layer 112 is oriented at an oblique angle θ, layer 112 and bonded joint 102 are moved from the plane of maximum shear stress, which facilitates improving load capacity of shaft 21. Furthermore, because inner layer angle θ also facilitates improving torsion and bending stiffness of shaft 21. In addition, angle θ also provides torque limiting for shaft 21. Accordingly, shaft section 102 and bonded joint 100 facilitate improving a useful life of shaft 21.

The above-described bonded joint is cost-effective and highly reliable. The shaft section including the bonded joint is formed at an oblique angle that facilitates shifting the bonded joint from the plane of maximum shear stress during shaft rotation. Furthermore, because the inner layer of the bonded joint is oriented obliquely with respect to the shaft, the bonded joint provides torque limiting for the associated shaft 21. As a result, the bonded joint facilitates extending a useful life of the shaft in a cost-effective and reliable manner.

While the invention has been described in terms of various specific embodiments, those skilled in the art will recognize that the invention can be practiced with modification within the spirit and scope of the claims.

what is claimed is:

1. A method for manufacturing a rotor shaft, said method comprising:

fabricating a first shaft portion from a first material such that the first shaft portion extends axially from a first end to a second end;

fabricating a second shaft portion from a second material that is different from the first material, such that the second shaft portion extends axially from a first end to a second end;

coupling the second shaft portion to the first shaft portion with an explosive bonded joint such that the second shaft portion is aligned substantially concentrically with respect to the first shaft portion, and such that the bonded joint extends obliquely with respect to a centerline axis of symmetry of the rotor shaft; and extending a layer of material within the bonded joint to separate the first shaft portion from the second shaft portion, wherein the layer of material is fabricated from a material that is different than the first and second materials.

2. A method in accordance with claim 1 wherein coupling the second shaft portion to the first shaft portion further comprises using an explosive bonded joint that is oblique with respect to a plane of maximum shear stress induced within said rotor shaft during operation.

3. A method in accordance with claim 1 wherein coupling the second shaft portion to the first shaft portion further comprises using an explosive bonded joint such that the bending stiffness of the rotor shaft is increased.

4. A rotor shaft comprising a first shaft portion from a first material such that the first portion extends axially from a first end to a second end, and a second shaft portion from a second material that is different from said first material and such that the second shaft portion extends axially from a first end to a second end, said first shaft portion coupled to said second portion at a bonded joint such that said first shaft portion substantially axially-aligned with respect to said second shaft portion, said bonded joint extending obliquely with respect to a centerline axis of symmetry of said rotor shaft, said bonded joint comprises a layer of material extending within the bonded joint to separate the first shaft portion from the second shaft portion, said layer of material is fabricated from a material that is different than said first and second materials.

5. A rotor shaft in accordance with claim 4 wherein said first shaft portion coupled to said second shaft portion by explosive bonding.

6. A rotor shaft in accordance with claim 4 wherein said bonded joint configured to facilitate increasing the bending and torsional stiffness of said rotor shaft.

7. A rotor shaft in accordance with claim 4 wherein said bonded joint oblique with respect to a plane of maximum shear stress induced within said rotor shaft.

8. A gas turbine rotor shaft comprising a first shaft portion fabricated from a first material, a second shaft portion fabricated from a second material that is different than said first material, and a bonded joint extending therebetween and substantially concentrically aligned with respect to said first and second portions, said bonded joint oblique with respect to a centerline axis of symmetry extending axially through said rotor shaft, said bonded joint comprises a layer of material extending within the bonded joint to separate the first shaft portion from the second shaft portion, said layer of material is fabricated from a material that is different than said first and second materials.

9. A gas turbine rotor shaft in accordance with claim 8 wherein said bonded joint comprises an explosive bonded joint.

10. A gas turbine rotor shaft in accordance with claim 8 wherein said bonded joint facilitates increasing bending and torsional stiffness of said rotor shaft.

11. A gas turbine rotor shaft in accordance with claim 8 wherein said first shaft portion fabricated from a first metallic material, and said second shaft portion fabricated from a second metallic material, said first material different from said second material.

12. A gas turbine rotor shaft in accordance with claim 8 wherein said bonded joint oblique with respect to a plane of maximum shear stress induced within said rotor shaft.

* * * * *